No. 842,905. PATENTED FEB. 5, 1907.
P. P. NUNGESSER.
COMBINED BLOWPIPE AND SOLDERING ATTACHMENT.
APPLICATION FILED SEPT. 25, 1905.
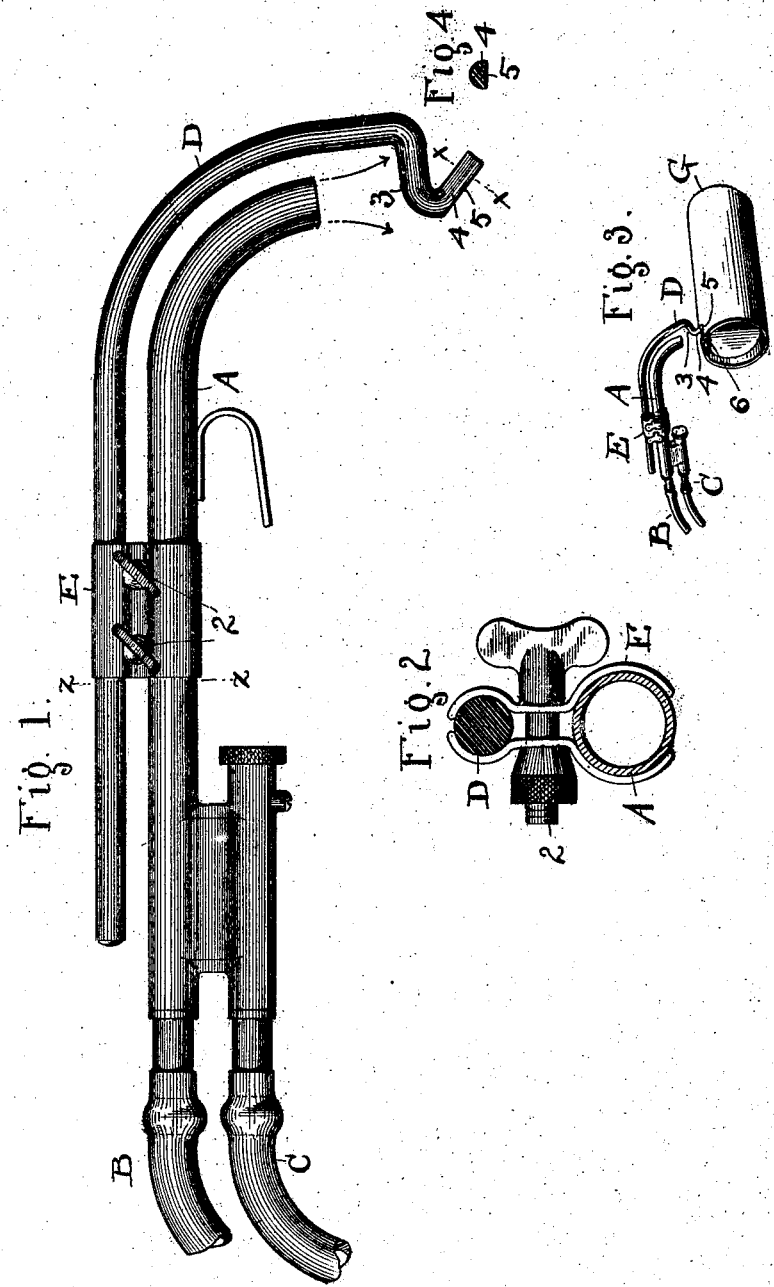
ATTEST.
INVENTOR.
Philip P. Nungesser
By H. I. Fish ATTY

UNITED STATES PATENT OFFICE.

PHILIP P. NUNGESSER, OF CLEVELAND, OHIO, ASSIGNOR TO THE NUNGESSER ELECTRIC BATTERY CO., OF CLEVELAND, OHIO, A CORPORATION OF OHIO.

COMBINED BLOWPIPE AND SOLDERING ATTACHMENT.

No. 842,905.      Specification of Letters Patent.      Patented Feb. 5, 1907.

Application filed September 25, 1905. Serial No. 280,024.

*To all whom it may concern:*

Be it known that I, PHILIP P. NUNGESSER, a citizen of the United States, residing at Cleveland, in the county of Cuyahoga and State of Ohio, have invented certain new and useful Improvements in a Combined Blowpipe and Soldering Attachment, and do declare that the following is a full, clear, and exact description of the invention, which will enable others skilled in the art to which it appertains to make and use the same.

My invention relates to a combined blowpipe and soldering attachment designed more especially for soldering binding-posts on dry-battery cells, but not necessarily limited to this use.

In the accompanying drawings, Figure 1 is a side elevation of the complete invention, comprising the blowpipe with gas connections and the soldering attachment; and Fig. 2 is a cross-section on line $zz$, Fig. 1. Fig. 3 is a perspective view, reduced in size, of the combined device seen in Fig. 1 and of a can or cell with a binding-post thereon and showing how the can with the post is held to the soldering-iron to effect the soldering. Fig. 4 is a cross-section on line $xx$, Fig. 1.

I do not claim herein that it is broadly new to use a blowpipe with gas as a means for heating or melting solder for securing binding-posts to battery-cells, because it was the practice prior to my invention to use blowpipes for this purpose, and the usual method of proceeding was to expose the can with the binding-post thereon and the requisite solder to the flame until the solder melted and fused into binding relation with the parts, when the work was supposed to be finished; but this manner of proceeding was found to be defective and unsatisfactory in results, first, because is did not provide for mechanical application of the solder, and, secondly, because at the best the operation was slow relatively. Now I have overcome both these material objections by attaching a soldering-iron directly to the blowpipe and sustaining the same in such relation to the flame that I can utilize the iron and not depend on the flame to do the soldering. A reference to the construction and relation of the parts will make this clear. Thus the blowpipe, as shown herein, is adapted to burn gas or vapor, and the said pipe proper, A, has air connection B and gas or vapor pipe connection C, and any usual or needed means may be employed to regulate the flow of volume of both air and gas.

D represents the soldering-iron, which is removably or detachably secured in working position by relatively wide clamps or jaws E, providing broad bearing-surfaces and adapted to be clamped upon both pipe A and iron D in a rigid manner, so that the relations of these parts will not change during use. Screw-bolts 2 engage through said clamps between tube A and iron D, and any suitable support for the device as a whole may be provided.

The working end of iron D is curved downward over the end of pipe A, and at a suitable distance from the end of said pipe, where the flame presumably is most intense, the said iron is bent inward at 3 at substantially right angles directly in the path of the flame, while the extremity 4 of the said iron beneath said bend is bent back at an acute angle and provided with a flattened surface 5 on its bottom. This latter portion of the iron is designed to do the work, and its exposure to the flame is such that it is brought to at least a red heat and maintained at this heat during the entire time the soldering operations are continued. This works two very important advantages, as already suggested, because it provided a fixed iron by means of which the solder is melted and applied about the edge of the binding-post very much as would be done by a hand-tool, the cell being manipulated as this operation proceeds instead of the tool, and the further advantage of having a fixed tool always heated and ready to do soldering the moment it is touched, instead of waiting until the parts become heated to a fusing-temperature, as formerly when no such iron was known and the blowpipe alone was used. The iron D preferably consists of what is known as "Norway" iron, because this particular kind of iron has superior powers of endurance in this severe use, and the said iron is made of such length that as it gets burnt away it may be reshaped at the using end and let out at clamps E. Hence said iron is in the form of a rod or bar of suitable size in length and cross-section.

In Fig. 3 the can or cell G, which has the binding-post 6 set in the edge thereof, is shown about as it is held by hand in relation to iron D when soldering is being done. It will be noticed that the flattened surface 5 of point 4 is adapted to rest down upon the solder and a very little turning or movement of the cell is required to make the solder flow where desired. At the longest it is the work of practically a moment, and the mechanical touch through point 4 makes the work promptly effective.

What I claim is—

1. A blowpipe having a downwardly-curved outer end, in combination with a soldering-iron D adjustably clamped upon said pipe and bent to conform therewith and having its outer free end formed with a substantially right-angled portion 3 and inclined extremity 4, and said end formed to substantially V shape and directly in line with the discharge from the mouth of the said pipe.

2. A gas-heating blowpipe A bent downwardly at its outer end, in combination with a soldering-iron secured thereto and having a soldering end substantially V shape in side elevation and the inner portions 3 of said end standing directly across the mouth of said pipe and the outer portion extending at an inclination away from said portion 3 and in the same vertical plane therewith and with the bent end of said pipe A, and in line with the discharge of said pipe.

In testimony whereof I sign this specification in the presence of two witnesses.

PHILIP P. NUNGESSER.

Witnesses:
R. B. MOSER,
C. A. SELL.